United States Patent [19]
Cluzeau et al.

[11] Patent Number: 5,103,134
[45] Date of Patent: Apr. 7, 1992

[54] RECONDITIONABLE PARTICLE-GENERATING TUBE

[75] Inventors: Serge Cluzeau, Boissy Saint Leger; Géard Verschoore, Creteil, both of France

[73] Assignee: U. S. Philips Corporation, New York, N.Y.

[21] Appl. No.: 392,632

[22] Filed: Aug. 11, 1989

[30] Foreign Application Priority Data

Aug. 26, 1988 [FR] France ............................. 88 11260

[51] Int. Cl.⁵ .......................... H01J 9/50; H01J 17/22; G01T 3/06
[52] U.S. Cl. .................................. 313/545; 313/538; 376/109; 445/2; 445/61; 250/390.11
[58] Field of Search ............... 313/545, 523, 538, 237; 250/390.11; 445/2, 61; 376/151, 109, 110

[56] References Cited

U.S. PATENT DOCUMENTS

| | | | |
|---|---|---|---|
| 2,951,945 | 9/1960 | Goodman | 250/84.5 |
| 3,581,093 | 5/1971 | Carr | 250/84.5 |
| 3,766,390 | 10/1973 | Fabian | 376/151 |
| 3,784,824 | 1/1974 | Reifenschweiler | 250/84.5 |
| 3,794,875 | 2/1974 | Stark | 376/109 |
| 3,836,785 | 9/1974 | Reifenschweiler | 250/501 |
| 4,300,054 | 11/1981 | Dance et al. | 376/110 |

FOREIGN PATENT DOCUMENTS 1438429 3/1965 France .

Primary Examiner—Donald J. Yusko
Assistant Examiner—John Giust
Attorney, Agent, or Firm—Robert J. Kraus

[57] ABSTRACT

A device for reconditioning a neutron tube, comprising on the one hand invariant elements and on the other hand sensitive elements which are subject to wear and gaseous elements which are consumable and which are introduced by way of reservoirs. In accordance with the invention the sensitive elements, for example target (6) and gas reservoirs (7, 8) are collected in the same part (1') of the tube, which part is separable from the other part (1) by means of a tight connection system (12, 12', 13, 14 and 15) in order to make the replacements necessary for reconditioning.

6 Claims, 3 Drawing Sheets

RECONDITIONABLE PARTICLE-GENERATING TUBE

BACKGROUND OF THE INVENTION

The invention relates to a reconditioning device for a particle-generating tube, comprising relatively resistant elements, relatively sensitive elements and consumable elements such as a gas or a gaseous mixture contained in reservoirs in order to be introduced into the tube under low pressure.

A device of this kind is used, for example in mobile or transportable neutron generators. These generators currently comprise "sealed" and "non-evacuated" neutron tubes in order to remove the restrictions as regards keeping the tubes in vacuum condition.

The term "sealed" actually refers to a customary technique used to ensure the tightness necessary for operation and antonomy of the tube and which isolates the system in a permanent manner. However, any intervention from the outside is impossible without affecting the product.

The most vulnerable element of the neutron tube is the target which is pulverized under the influence of the bombardment by the incident ion beam. Replacement of this element would enable reconditioning of the tube at the end of its service life. Such an intervention means that the tube is brought into contact with air again, causing deterioration of the gas reservoirs (deuterium and tritium) which must then also be replaced.

SUMMARY OF THE INVENTION

It is an object of the invention to propose a device which enables replacement of faulty elements by operations which are much simpler, the faulty items being less costly than those which are still operational.

To achieve this, the invention is characterized in that the sensitive elements and the gas reservoirs are grouped in the same part of the tube, which part can be separated from the other part by means of a connection system which provides tightness.

Said connection system is preferably formed by flanges with a tight metallic joint.

This joint has a circular shape and a deformable toroidal cross-section and must be compatible with the temperatures and pressures necessary for making the tube operational again.

The assembly of flanges is formed by two flanges which are shaped as circular rings and which are integral with the separable one part and the other part of the tube, respectively, and by an intermediate flange which has the same shape but a smaller width and which adjoins the joint and is locked between the flanges by means of fixing screws.

The thickness of this intermediate flange must be smaller than the external diameter of the toroidal section of the joint so that the pressure value required for suitable tightness is obtained after compression of the joint to the thickness of the intermediate flange.

Another connection system is preferably formed by two metallic rings which are integral with one part and the other part, respectively, of the tube and which are fitted against one another and are closed by soldering or thermal compression along their periphery in order to ensure tightness.

For reconditioning the tube the rings are opened by means of an appropriate tool and are closed by soldering or thermal compression, successively at different circumferential levels.

The part of the tube in which the replaceable elements are collected comprises the elements necesssary for reconditioning the tube, such as a device for progressively exposing the tube to atmospheric pressure and a pumping tube.

BRIEF DESCRIPTION OF THE DRAWING

The invention will be described in detail hereinafter, by way of example, with reference to the accompanying diagrammatic drawing figures.

DESCRIPTION OF THE PREFERRED EMBODIMENTS

Figure 1B:
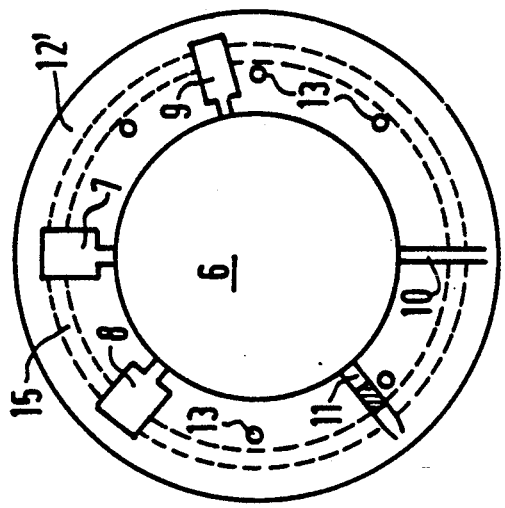
FIGS. 1a and 1b diagrammatically show a device enabling the reconditioning of a neutron tube in accordance with the invention.
Figure 1A:
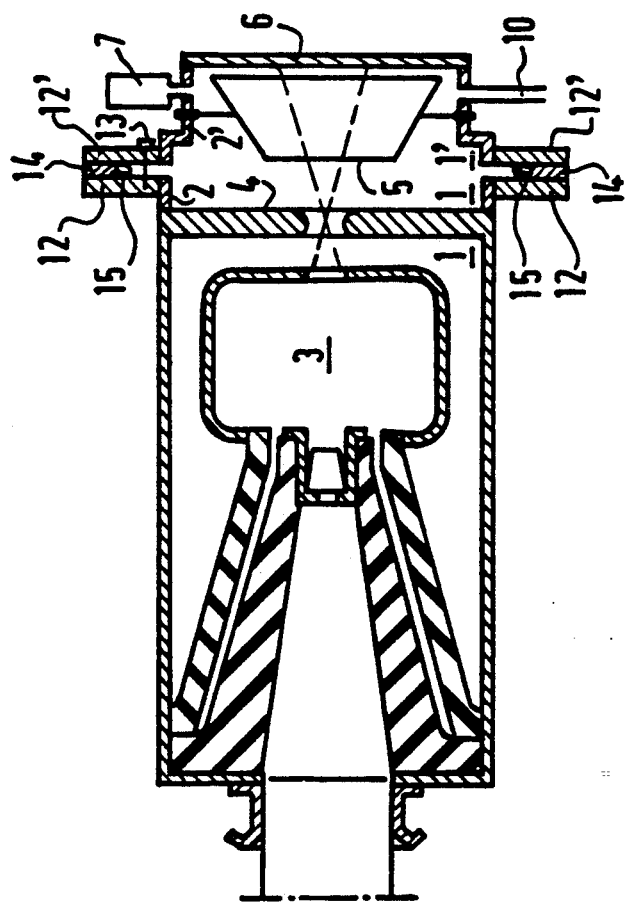

FIG. 1a is a longitudinal sectional view of a neutron tube which is divided into two distinct parts 1 and 1'.

The part 1 to be saved is the part in which all elements are invariant and hence reusable after a given period of use of the tube. It comprises the ion source 3 and the accelerator electrode 4 which are integral with the wall 2.

The part 1' to be replaced, shown in a cross-sectional view in FIG. 1b, comprises not only the faulty elements to be replaced (target 6 and titanium reservoirs 7 and 8) but also elements which have not been damaged (suppressor electrode 5 and gauge 9) as well as the elements provided in this part for reconditioning the tube (pumping tube 10 and device 11 for progressively exposing the tube to atmospheric pressure).

The target 6 which is exposed to the bombardment by the beam produced by the ion source 3 is the most vulnerable element and its replacement necessitates opening of the tube and bringing it into contact with air.

The titanium reservoirs 7 and 8 contain the deuterium-tritium mixture which serves to pressurize the tube on the basis of the equilibrium properties of the Ti-H system. When the tube is opened or during recycling operations, the titanium is chemically very active in contact with the ambient air and loses its "getter" properties so that these reservoirs become unusable.

The pumping tube 10 is a simple orifice which is formed by a copper tube via which, after the mounting of the new part 1' of the tube, degasing, evacuation and impregnation of the tube with a deuterium-tritium mixture take place before closing the tube 10 simply by squeezing.

The device 11 enables a progressive admission of air or neutral gas in order to re-establish atmospheric pressure inside the tube so that it can be opened. It may be formed by a valve or simply by a tube in which a metallic filter is inserted. Thus, the admission of air or neutral gas is realized extremely slowly and the filter prevents contamination of the interior of the tube by dust particles or other impurities.

A connection system which ensures tightness between the two parts of the tube is formed by two flanges which are shaped as circular rings 12 and 12' which are integral with the walls 2 and 2', respectively, of the tube, and an intermediate flange 14 which has the same shape but a smaller width and which adjoins a metallic joint 15 and is compressed between the flanges 12 and 12' by means of fixing screws The joint 15 is formed by a circular ring having a deformable toroidal section which is compressed between the flanges 12 and 12'. It is designed so that it can cope with the temperatures and pressures arising in making the tube operational.

The thickness of the flange 14 is smaller than the external diameter of the toroidal section of the joint 15 so that the pressure necessary for suitable tightness is obtained after compression of the joint to the thickness of the flange.

Other arrangements are feasible which necessitate only the replacement of the used and deteriorated elements of the tube.

Figure 2B:
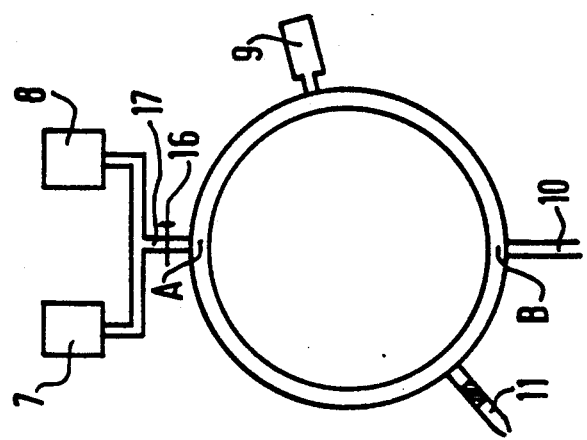
FIGS. 2a and 2b show an alternative embodiment of the device shown in the FIGS. 1a and 1b.
Figure 2A:
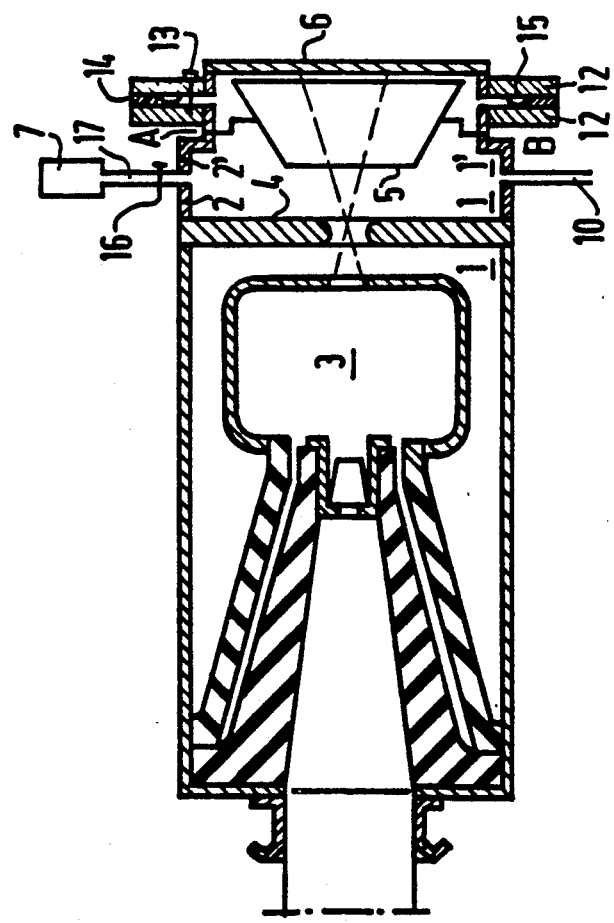

If the separation is realized exactly at the level of the target, as shown in FIG. 2a, and if a tight closing system 16 on a tube 17 which is common to the gas reservoirs 7 and 8 is available, as shown in FIG. 2, only the target and the reservoirs will be replaced and the elements which need not be replaced in the part of the tube situated beyond the accelerator electrode are saved.

Figure 3B:
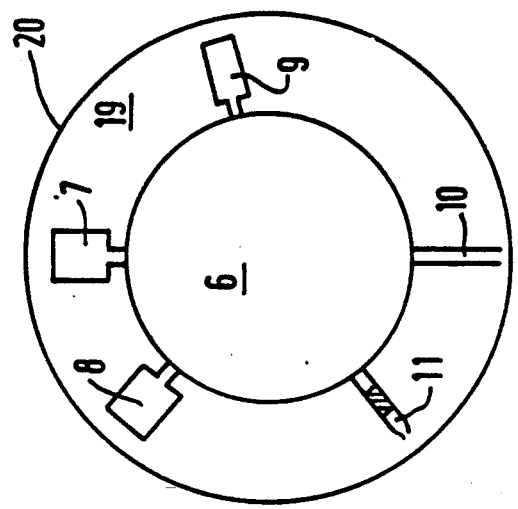
FIGS. 3a and 3b show another reconditionable device in accordance with the invention.
Figure 3A:
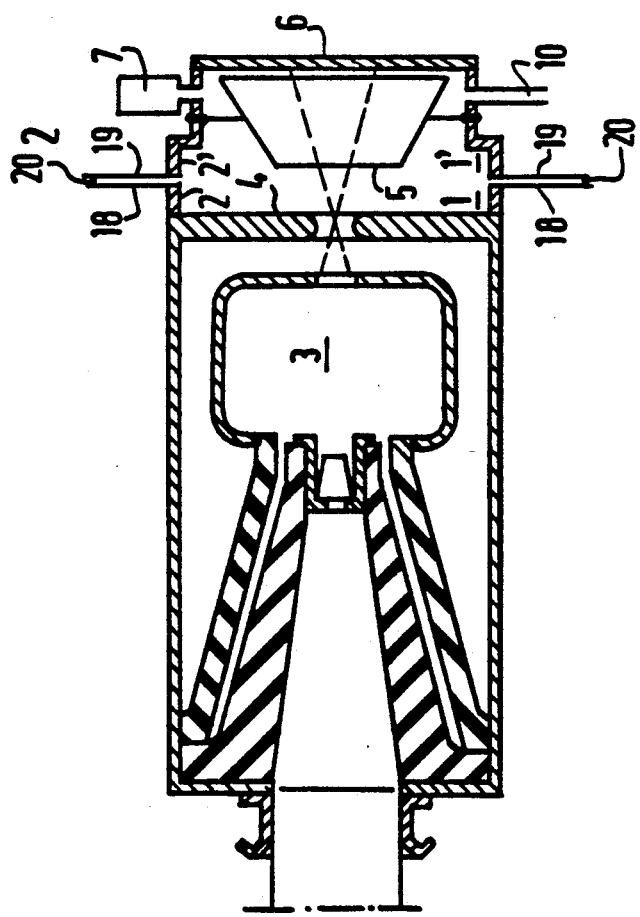

Another connection system between the parts 1 and 1' of the same neutron tube is shown in FIG. 3.

This system is formed by two metallic rings 18 and 19 which have a circular shape and a small thickness and which are integral with the walls 2 and 2', respectively, of the tube, which rings are arranged one against the other and are closed by soldering or by thermal compression along their periphery 20 in order to ensure tightness.

The opening of the tube for reconditioning is performed by a cut along a circumference of the ring as near as possible to the periphery. This operation necessitates the use of a special tool for cutting, for example by pressure, gearwheels, drawing or a laser beam. The part 1' of the tube 1 can thus be removed and replaced by a new part. The opening and closing operations are thus successively repeated along different, descending circumference levels.

The connection systems between the two parts of the neutron tube described above represent two extreme solutions as regards the nature of the difficulty of realization.

The connection system involving a metallic tight joint necessitates flange thicknesses and a number of fixing screws which are comparatively large in order to take into account bending and the forces exerted, implying a large amount of material; this is a drawback in the case of high-flux neutron tubes for which the activation effect of the material is proportional to the mass of the material in the vicinity of the flux. On the other hand, the operations for mounting and removal are easy and do not require special tools.

The connection system involving successive soldering and cutting is a more simple system. It is more reliable as regards the risk of leaks. The quantity of material involved in the activation is smaller. This system, therefore, is less cumbersome itself than the system utilizing the toroidal joint, but it necessitates the use of a special tool for the successive cutting operations; this implies a substantial investment.

We claim:

1. A reconditionable particle generating tube comprising at least one durable element, at least one nondurable element and at least one reservoir containing a substance for consumption during operation of the tube, characterized in that the at least one nondurable element and the at least one reservoir are contained in a first part of the tube and the at least one durable element is contained in a second part of the tube which is attached to the first part by means of a pressure tight connection and is separable from the first part to facilitate reconditioning of the tube; said pressure tight connection comprising:

a. first and second circumferential flanges attached to the first and second parts, respectively;
   b. a first intermediate member disposed between the flanges and having a corresponding circumferential shape and a predetermined thickness;
   c. a second intermediate member disposed between the flanges adjacent the first intermediate member and having a corresponding circumferential shape, at least a portion of said second member being deformable and having a thickness larger than the predetermined thickness; and
   d. means for pressing the flanges against the first and second intermediate members and compressing said members to the predetermined thickness.

2. A reconditionable tube as in claim 1 where the second member comprises a deformable toroidal portion capable of withstanding temperatures and pressures experienced during the reconditioning of the tube.

3. A reconditionable particle generating tube comprising at least one durable element, at least one nondurable element and at least one reservoir containing a substance for consumption during operation of the tube, characterized in that the at least one nondurable element and the at least one reservoir are contained in a first part of the tube and the at least one durable element is contained in a second part of the tube which is attached to the first part by means of a pressure tight connection and is separable from the first part to facilitate reconditioning of the tube; said pressure tight connection comprising first and second circumferential metal bands which are integral portions of the respective first and second parts, respectively, said bands facing each other and having respective peripheral portions affixed directly to each other to form a pressure tight seal, said bands being sufficiently wide to enable cutting away of the peripheral portions to effect separation of the first and second parts of the tube to facilitate reconditioning and to enable peripheral reaffixation to form a new pressure tight seal.

4. A reconditionable tube as in claim 1, 2 or 3 where the first part of the tube includes means for progressively increasing internal pressure of the tube to atmospheric pressure.

5. A reconditionable tube as in claim 4 where the means for progressively increasing internal pressure comprises a valve.

6. A reconditionable tube as in claim 4 where the means for progressively increasing internal pressure comprises a tube in which is disposed a metallic filter.

* * * * *